US007730050B2

(12) United States Patent
Iketani et al.

(10) Patent No.: US 7,730,050 B2
(45) Date of Patent: Jun. 1, 2010

(54) INFORMATION RETRIEVAL APPARATUS

(75) Inventors: Naoki Iketani, Yokohama (JP); Hideo Umeki, Yokohama (JP); Kenta Cho, Tokyo (JP); Sogo Tsuboi, Kawasaki (JP); Masayuki Okamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 276 days.

(21) Appl. No.: 11/725,474

(22) Filed: Mar. 20, 2007

(65) Prior Publication Data

US 2007/0255706 A1 Nov. 1, 2007

(30) Foreign Application Priority Data

Mar. 29, 2006 (JP) ............................ 2006-092028

(51) Int. Cl.
*G06F 17/30* (2006.01)

(52) U.S. Cl. ........................ 707/706; 707/708; 707/710

(58) Field of Classification Search ................ 707/1-3; 704/7-102

See application file for complete search history.

(56) References Cited

U.S. PATENT DOCUMENTS 5,138,669 A * 8/1992 Shimura et al. ............ 382/229
5,289,375 A * 2/1994 Fukumochi et al. ........... 704/2
6,373,859 B1 * 4/2002 Jedwab et al. ............... 370/479
2002/0018514 A1 * 2/2002 Haynes et al. .............. 375/130

(Continued)

FOREIGN PATENT DOCUMENTS

JP 10-55371 2/1998

(Continued)

OTHER PUBLICATIONS

Masui, T., "POBox: An Efficient Text Input Method for Handheld and Ubiquitous Computers," Proceedings of the International Symposium on Handheld and Ubiquitous Computing (HUC'99), pp. 289-300, (Sep. 1999).

(Continued)

*Primary Examiner*—Don Wong
*Assistant Examiner*—Hanh B Thai
(74) *Attorney, Agent, or Firm*—Finnegan, Henderson, Farabow, Garrett & Dunner, L.L.P.

(57) ABSTRACT

An information retrieval apparatus includes a display which displays document information, an input unit which adds additional information to the document information displayed the display, a first storage which stores mark symbol information specifying a particular symbol used for marking, a detector which detects an input from the input unit and decides whether or not the input additional information is identical to or similar to the mark symbol information stored in the first storage, a second storage which stores the mark symbol information and the additional information which is decided that it is similar to the mark symbol information by the detector, associating with the mark symbol information, and a retrieval unit which retrieves the mark symbol information and the additional information associated with the mark symbol information from the second storage, and a retrieval result by the retrieval unit is displayed on the display.

7 Claims, 4 Drawing Sheets

U.S. PATENT DOCUMENTS

| | | | | |
|---|---|---|---|---|
| 2002/0059370 | A1* | 5/2002 | Shuster | 709/203 |
| 2003/0081781 | A1* | 5/2003 | Jensen et al. | 380/253 |
| 2003/0110264 | A1* | 6/2003 | Whidby et al. | 709/227 |
| 2004/0001013 | A1* | 1/2004 | Kim et al. | 341/67 |
| 2004/0117719 | A1* | 6/2004 | Lehobey et al. | 714/781 |
| 2004/0210560 | A1* | 10/2004 | Shuster | 707/3 |
| 2005/0027513 | A1* | 2/2005 | Kanno | 704/10 |
| 2005/0086212 | A1* | 4/2005 | Hughes et al. | 707/3 |
| 2005/0278292 | A1* | 12/2005 | Ohi et al. | 707/1 |

FOREIGN PATENT DOCUMENTS

| | | |
|---|---|---|
| JP | 2002-342320 | 11/2002 |
| JP | 2004-151898 | 5/2004 |
| JP | 2004-199485 | 7/2004 |
| JP | 2006-65754 | 3/2006 |

OTHER PUBLICATIONS

Notice of Reasons for Rejection mailed Mar. 2, 2010, from the Japanese Patent Office in corresponding Japanese application No. 2006-092028.

* cited by examiner

| time | x | y |
|---|---|---|
| 1234500000 | 123 | 85 |
| 1234500023 | 121 | 84 |
| 1234500050 | 119 | 84 |
| 1234500073 | 118 | 82 |
| 1234500103 | 117 | 81 |
| 1234500119 | 117 | 80 |
| 1234500140 | 116 | 78 |
| 1234500170 | 116 | 75 |
| 1234500198 | 116 | 73 |
| 1234500230 | 117 | 72 |
| 1234500252 | 117 | 71 |
| 1234500271 | 118 | 70 |
| 1234500298 | 119 | 69 |
| 1234500325 | 120 | 68 |
| 1234500352 | 122 | 68 |
| 1234500377 | 125 | 67 |
| : | : | : |

FIG. 3

| Symbol code | Object data ID | Screen shot data File pointer |
|---|---|---|
| %E2%97%8E | 6502 | C:¥markimg¥00001.jpg |
| %E2%97%8E | 4795 | C:¥markimg¥00002.jpg |
| %28%E5%AE%BF%29 | 1192 | C:¥markimg¥00003.jpg |
| %E2%97%8E | 8574 | C:¥markimg¥00004.jpg |
| | | |

FIG. 4

INFORMATION RETRIEVAL APPARATUS

CROSS-REFERENCE TO RELATED APPLICATIONS

This application is based upon and claims the benefit of priority from prior Japanese Patent Application No. 2006-092028, filed Mar. 29, 2006, the entire contents of which are incorporated herein by reference.

BACKGROUND OF THE INVENTION

1. Field of the Invention

The present invention relates to an information retrieval apparatus and an information display apparatus, and an information retrieval method.

2. Description of the Related Art

In general, in the case where a portion having a specific meaning is retrieved from among a specific file and a file group, such a portion is retrieved by a keyword representing that meaning. Here, in the case where retrieval is made using a pen input system-based apparatus, which includes such as a tablet PC, after a keyword has been entered using a handwritten character recognition technique or using a software keyboard, keyword retrieval is made.

In the pen input system-based apparatus, there is an input system "POBox" of retrieving and presenting candidates for input character strings from a dictionary (including character strings that consist of a plurality of characters) with handwritten characters being a retrieval key. (Toshiyuki Masui. POBox: An Efficient Text Input Method for Handheld and Ubiquitous Computers. In Proceedings of the International Symposium on Handheld and Ubiquitous Computing (HUC'99), pp. 289-300, September 1999.) This system is intended to simplify an input. In this system, it is possible to assume that a character or part thereof is inputted by handwriting, thereby executing a retrieval targeted for a dictionary and presenting candidates. Further, in a broader sense, general handwritten character recognition or character input support software using kana-kanji conversion can also be a retrieval apparatus targeted for a character dictionary as in the system described above.

Further, in the pen input system-based apparatus, an operation using a software keyboard is also general, and there has been proposed an apparatus for retrieving and presenting input candidate character strings when a key on the software keyboard has been pressed (JP-A 2002-342320 (KOKAI)).

BRIEF SUMMARY OF THE INVENTION

An information retrieval apparatus according to an aspect of the invention comprises: a display configured to display document information; an input unit configured to add additional information to the document information displayed the display; a first storage configured to store mark symbol information specifying a particular symbol used for marking; a detector configured to detect an input from the input unit and decide whether or not the input additional information is identical to or similar to the mark symbol information stored in the first storage; a second storage configured to store the mark symbol information and the additional information which is decided that it is similar to the mark symbol information by the detector, associating with the mark symbol information; and a retrieval unit configured to retrieve the mark symbol information and the additional information associated with the mark symbol information from the second storage, and a retrieval result by the retrieval unit is displayed on the display.

BRIEF DESCRIPTION OF THE SEVERAL VIEWS OF THE DRAWINGS

FIG. 3 is a view showing an example of input data stored in an input data storage unit 22;

FIG. 4 is a view showing an example of data held in a mark symbol accompanying data storage unit 35.

DETAILED DESCRIPTION OF THE INVENTION

An embodiment will be described with reference to the accompanying drawings. In the embodiment, when data to be handled as a retrieval object is displayed, a symbol representing its feature is added to the retrieval object. This symbol is added so as to be overwritten on displayed data by using a pen input device, a touch panel device or the like. While this symbol is visible to a user as a mark, equipment holds data by associating the input symbol with its object data, and then, detects the symbol at the time of executing retrieval, thereby enabling retrieval of the object data and its reuse.

Figure 1:
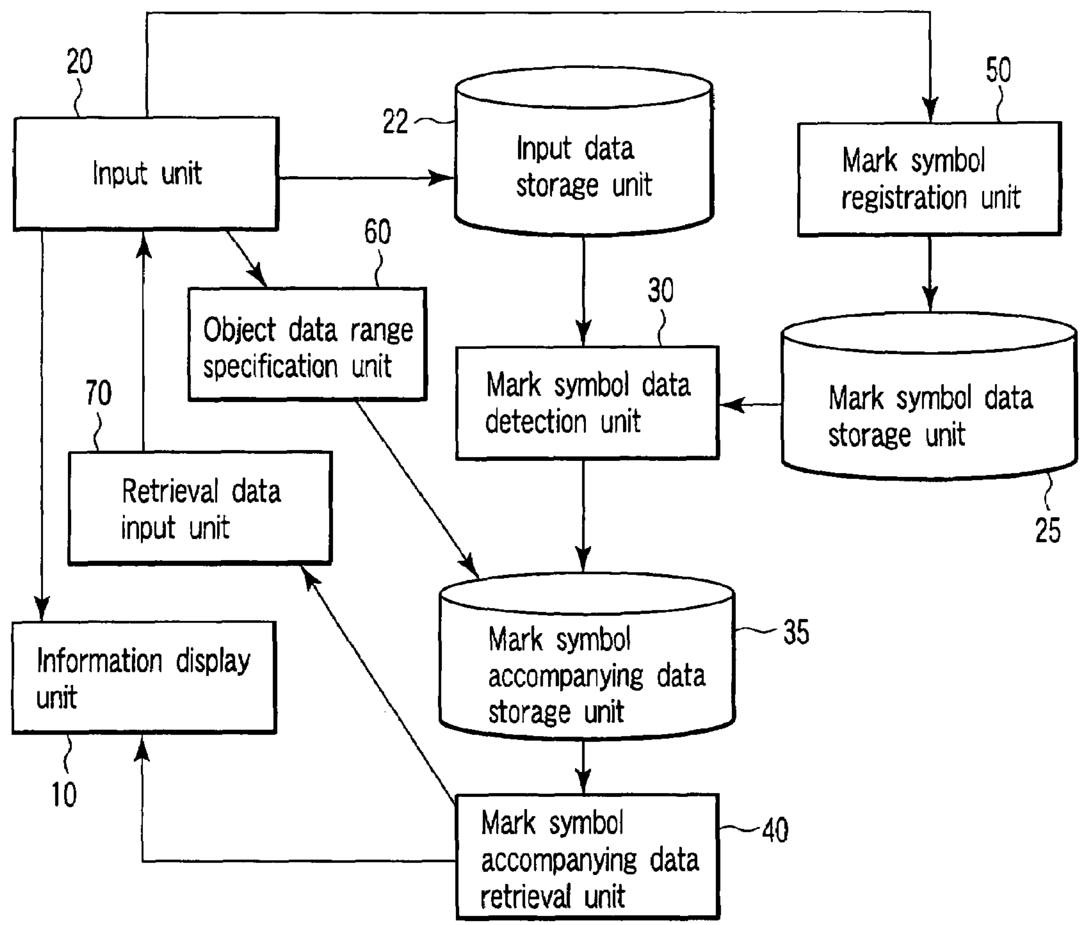
FIG. 1 is a block diagram depicting a general configuration of an information retrieval apparatus according to the embodiment.

As shown in FIG. 1, an information retrieval apparatus comprises: an information display unit 10; an input unit 20; an input data storage unit 22; a mark symbol data storage unit 25; a mark symbol data detection unit 30; a mark symbol accompanying data storage unit 35; and a mark symbol accompanying data retrieval unit 40. The information retrieval apparatus further comprises: a mark symbol registration unit 50; an object data range specification unit 60; and a retrieval data input unit 70. In an exemplary configuration shown in FIG. 2, a tablet PC client and a server are communicably interconnected via a LAN or any other network; a projector is connected to the tablet PC client; and a display of the tablet PC client and an added mark are projected on a screen. In addition, an electronic whiteboard terminal is connected to the server, and functions like the tablet PC client. In addition, the server comprises storage for storing a stroke sequence. This storage is equivalent to the mark symbol accompanying data storage unit 35 of FIG. 1, for example.

Figure 2:
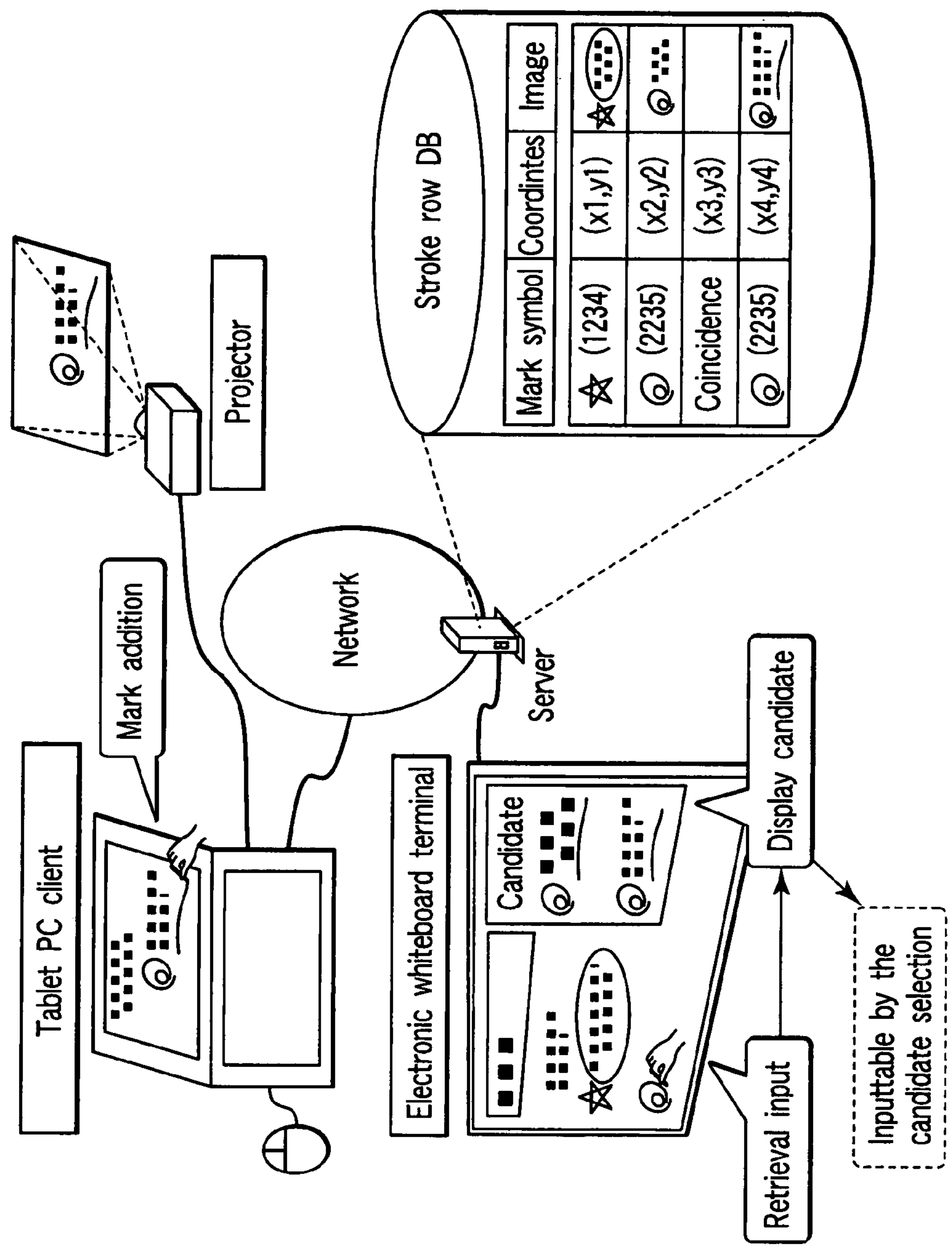
FIG. 2 is a view showing an actual exemplary configuration of an information retrieval apparatus according to the embodiment.

The information display unit 10 includes: a monitor of a PC (personal computer), for example, for displaying information such as graphics or characters; a projector enabling projection of a video image; a TV screen and the like. The information display unit 10 comprises: a function of displaying presentation or the like; a function of, in response to a pen input at the input unit 20 described later, displaying handwriting thereof; and a function of, in final retrieval, displaying a process and a result thereof. In the embodiment, it is assumed that the information display unit 10 is a monitor of a tablet PC. Further, it is assumed that a video image whose content is identical to screen display of the tablet PC is projected on a predetermined screen in an enlarged manner by using a projector. As shown in FIG. 2, an electronic whiteboard terminal may be provided instead of the tablet PC, and any display means may be used as long as similar display can be made.

The input unit 20 carries out an input for adding a symbol to information displayed on the information display unit 10. The input unit 20, in particular, enables an input by a pen-shaped device or fingers with respect to a display screen of the information display unit 10 on which information is displayed. For example, a pen and a keyboard and a mouse of the tablet PC and their control function portions are equivalent to this input device. The input unit 20 may be a PC or a PDA (personal digital assistant) enabling pen input, for example, a touch panel liquid crystal, and an electronic whiteboard that operates in conjunction with a projector. In the embodiment, it is assumed that an input pen of the tablet PC and a site for detecting and processing a pen input of a tablet PC main body as the input unit 20.

In the embodiment, when data is written (inputted) by a pen input on a screen of the tablet PC which is used as the information display unit 10, a video image added with its additionally written data is displayed at the information display unit 10 immediately. In this manner, desired data can be additionally written to the displayed video image. Here, it is assumed that presentation is carried out using graphics drawing software capable of providing slide display on a page by page basis. Namely, it is possible to make a page turning by a predetermined operation such as pressing a next-page display button and to carry out writing by pen on each page while such each page is displayed. In addition, at the time of issuance of a retrieval request described later, the retrieval request can be issued by menu operation using pen operation or mouse operation.

The input data storage unit 22 at least temporarily buffers and holds a signal train inputted by the input unit 20 in order to collectively input data to the mark symbol data detection unit 30. While an update history file (log file) for holding input data for a long time is also equivalent to this signal train, in the embodiment, it is assumed that input data is held on a volatile memory. The input data storage unit 22 has the memory and a program module that carries out buffering processing thereof. In the embodiment, input data is writing point data that forms a set of a time being a minimum unit of a writing point to be inputted, a coordinate value of an x coordinate (hereinafter, referred to as "x coordinate value") and a coordinate value of a y coordinate (hereinafter, referred to as "y coordinate value"), and a set of writing points is obtained as a set of input data to be buffered as shown in FIG. 3. The input data is continuously stored until a break of writing point data as described below is reached. Here, it is preferable that the break of the writing point data be a boundary of characters or symbols. For example, a case in which pen input does not occur for 1.0 second or more is detected, and this break is defined as a boundary. In this manner, input data up to this break is defined as one set. Then, one input data set is generated every time a break is detected, and then, the generated data sets are outputted to the mark symbol data detection unit 30 every time the input data set occurs.

The mark symbol data storage unit 25 holds information relating to specific symbols used for marks. In the embodiment, ID of a mark symbol is held on a memory. For example, in the embodiment, "◎" and "homework" are mark symbols. In order to identify that these symbols are mark symbols, the respective symbols are registered as codes "%E2%97%8E" and "%28%E5%AE%BF%29" (that is, character codes. Hereinafter, referred to as "symbol codes"), and the registered symbols are held on a memory.

The mark symbol data detection unit 30 inputs an input data set outputted from the input data storage unit 22. Then, by referring to the mark symbols held at the mark symbol data storage unit 25, it is decided whether or not the read input data set is a specific mark symbol. Here, it is assumed that the decision of mark symbols is achieved using a handwritten character recognition technique. A series of input data indicating a handwriting received as an input is inputted to a handwritten character recognition module (not shown), and the character code train of that recognition result and numeric values indicating probability of that recognition are received as a result from the handwritten character recognition module. Here, in the case where the input data set is not a mark symbol, i.e., in the case where the decision result does not match the mark symbol held at the mark symbol data storage unit 25, nothing is carried out (processing is terminated) because it means the input data set is not a mark symbol. In the case where the input data set is a mark symbol, it is decided whether or not object data added with that mark symbol exist. In addition, in the case where object data added with the mark symbol exist, a set of the mark symbol data type (i.e., symbol code), object data, and a screen shot of a screen currently displayed is outputted to the mark symbol accompanying data storage unit 35 described later. In the case where the input data set is the mark symbol but no object data exists, this is automatically regarded as a retrieval request, and then, the decided mark symbol ID is outputted to the mark symbol accompanying data retrieval unit 40.

Specifically, the following processing is carried out. A right-end x coordinate value is calculated from among input data that is writing point data configuring mark symbols. In addition, similarly, a maximum value and a minimum value of the y coordinate value of the writing point data for mark symbols are calculated, their average value is calculated, and then, the calculated value is defined as a y coordinate value for mark symbols. Then, with respect to this y coordinate value, it is calculated whether or not the existing data object is present in a range for n pixels defined in advance at the right side of the right-end x coordinate value. Further, presentation is carried out here using drawing software. Thus, from a data structure held by the drawing software, it is decided whether or not a data object exists in the range of the corresponding y coordinate value and x coordinate value with respect to the range of the coordinate value of all of the currently displayed data objects. As described above, when the mark symbol is inputted, it is decided to which data object the symbol has been added. Finally, this is obtained as a mark symbol. In the case where the object data added therewith has been decided, a mark symbol data type, an object data ID, and screen shot data are grouped, and then, the grouped data are outputted to the mark symbol accompanying data storage unit 35.

The mark symbol accompanying data storage unit 35 holds data targeted for retrieval and added with the mark symbol data recognized by the mark symbol data detection unit 30, together with the mark symbol data type. Specifically, the mark symbol accompanying data storage unit 35 inputs one set of three elements, i.e., the mark symbol data type, the object data ID, and the screen shot data, and then, holds the input set as data targeted for retrieval. In the embodiment, objects of graphics or character strings are specified as data targeted for retrieval. Note that the data targeted for retrieval is mounted as an update history file. In actuality, the mark symbol accompanying data storage unit 35 holds the data shown in FIG. 4, for example.

The mark symbol accompanying data retrieval unit 40 retrieves required data from among sets of data added with mark symbols in advance, the data sets being stored in the mark symbol accompanying data storage unit 35, and then, outputs the retrieved data to the information display unit 10. Specifically, the mark symbol accompanying data retrieval unit 40 presents the information display unit 10 with the data held in the mark symbol accompanying data storage unit 35 while a mark type is handled as a key. Here, it is assumed that there are provided: a mode for listing object data added with marks; a mode for reducing screen shot images, and then, listing and displaying the reduced images as thumbnails; and a method for listing and displaying these two modes in array. Retrieval request input is obtained by a method for using a keyboard to input "◎" or "homework" that are symbols corresponding to mark symbols specified for a retrieval request input window; a method for inputting a symbol to the window by handwriting, and then, using as a retrieval key a symbol code obtained by recognizing the inputted symbol by means of a handwritten character recognition module; and a method for, in the case where a mark symbol has been inputted in a location where no additional data exists, as described previously, regarding it as a retrieval request. As a retrieval result obtained by the mark symbol accompanying data retrieval unit 40, it is possible for a user to list sets of data added with "◎" that are important portions or screen shots of pages, and to list sets of data added with the mark "homework" that denotes a homework item. Thus, for example, in the case where presentation is reviewed after a while, it is possible to sample and check important issues or to list and display portions marked with "◎" as a summary of important items at the end of presentation. While it is assumed that the mark symbol accompanying data retrieval unit 40 is provided as a retrieval program, an operational timing of this function is not limited to only a case in which a user being a retriever has explicitly inputted a retrieval request. It is possible to use a system of providing retrieval and display when it is recognized that a mark symbol has been inputted.

The mark symbol registration unit 50 registers the input data inputted from the input unit 20 as it is into the mark symbol data storage unit 25 or extracts a feature portion of the input data, and then, registers the extracted portion into the mark symbol data storage unit 25. In the case where the input data inputted from the input unit 20 is registered as it is into the mark symbol data storage unit 25, the mark symbol registration unit 50 may not be used.

The object data range specification unit 60 monitors pen input in line with the mark symbol data detection unit 30, and then, detects whether or not object data has been specified. In the simplest way, this can be achieved in accordance with a system of selecting data in units of pages or in units of data objects in drawing software. For example, in the case where an object clicked by a pen or a mouse becomes active, it is possible to regard the clicked object as specification of object data. Then, data is registered into the mark symbol accompanying data storage unit 35 by combining the symbol recognized by the symbol data recognition unit and the object data specified by the object data range specification unit 60. A system of enabling writing in a natural operation on a document is desired as an operation of the object data range specification unit 60. For example, methods of specifying the range of object data include: underlining, enclosing a range by circle or rectangle, range specification using a rectangle, object double-tap and the like. For example, with respect to detection of an underline, the object data range specification unit 60 always monitors inputs. In the case where a line having a predetermined length or more has been entered laterally, it can be regarded that a y coordinate value that is in the range of the x coordinate value and that is distant from the entered line has specified a range of 0 to h pixels.

The retrieval data input unit 70 assigns retrieval data to the input unit 20 in accordance with a retrieval request inputted from the mark symbol accompanying data retrieval unit 40. This retrieval data, as described above, is made of mark symbols. These mark symbols are inputted to the input unit 20, and the data added with the mark symbols is retrieved by means of the mark symbol accompanying data retrieval unit 40.

Figure 5:
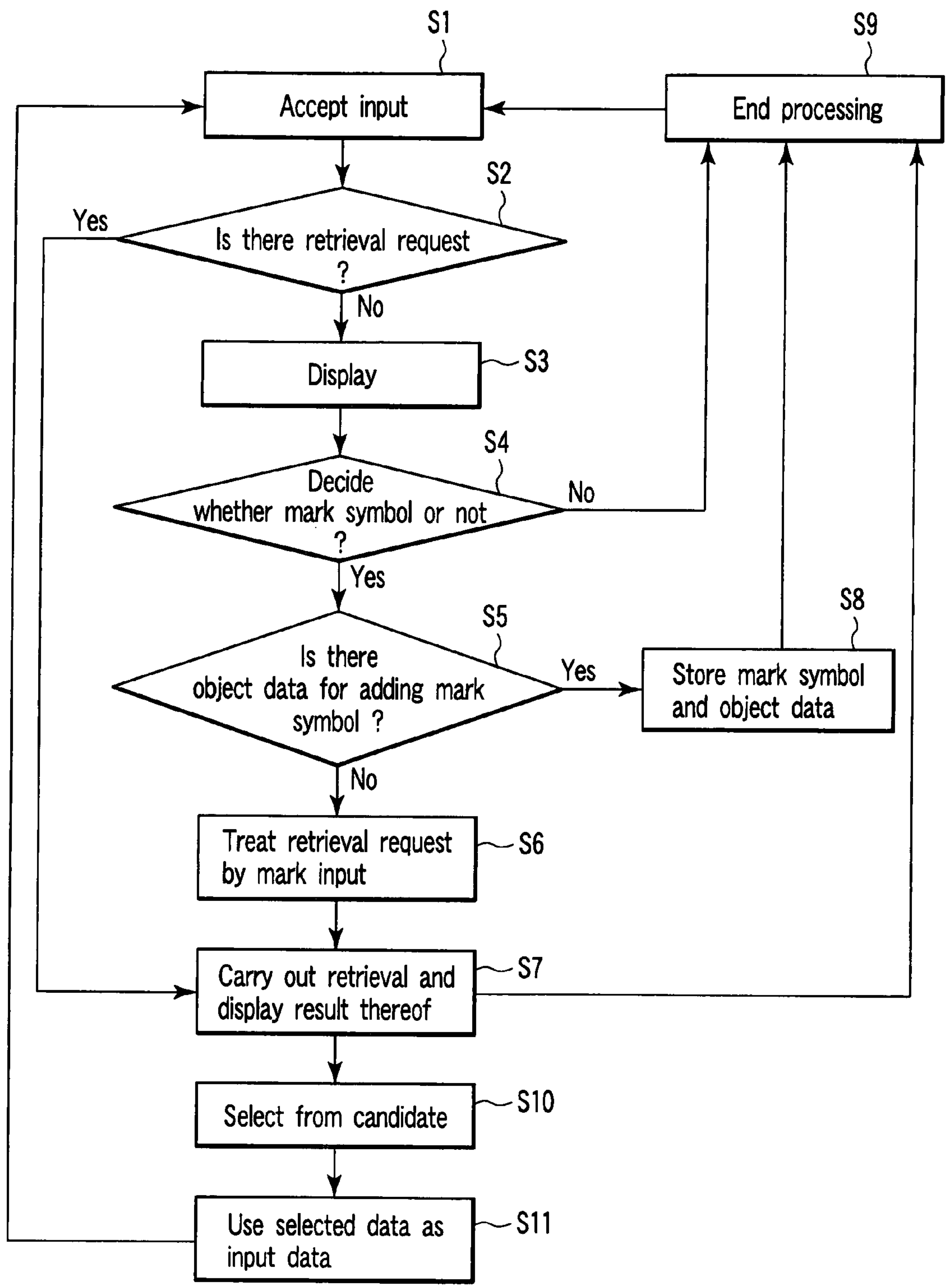
FIG. 5 is a flowchart showing a flow of operation of an information retrieval apparatus according to the embodiment.

Referring now to FIG. 5, a description will be given with respect to an operation of the information retrieval apparatus configured as described above. First, a description will be given with respect to an operation made at the time of executing presentation using graphics drawing software on a tablet PC. In this case, it is assumed that screen display of information on the tablet PC serving as the information display unit 10 and projection of a video image using a projector are carried out.

While presentation is in progress, it is assumed that a symbol "◎" has been inputted at the left of an important sentence in a superimposed manner on a displayed video image, by using an input pen equivalent to the input unit 20, and that a symbol "homework" has been inputted by a presenter being a user at the left of a homework item sentence due a next time (step S1). It is decided whether an input by this input unit 20 is a retrieval request or addition of a symbol to object data (step S2). (It is decided whether or not the inputted symbol is a mark symbol in the later step.) If the input is a retrieval request, retrieval based on the input is executed (step S7). Otherwise, the inputted data is displayed (step S3). The displayed pen input data inputted by the presenter is monitored by means of the mark symbol data detection unit 30 equipped with a handwritten character recognition function, via the input data storage unit 22 that is a temporary buffer.

Upon detecting the pen input data, the mark symbol data detection unit 30 decides whether or not the input data is a mark symbol (step S4). When the decision result is affirmative, it is decided whether or not this operation is an operation of adding a mark to the left side of the object having the inputted mark symbol (step S5). When the decision result is affirmative in step S5 (Yes in step S5), a mark symbol data ID, an object being mark symbol accompanying data targeted for such addition, and a screen shot of the presentation display screen are registered as one set of data into the mark symbol accompanying data storage unit 35 (step S8). In this manner, data storage is carried out by a mark addition operation made at the time of presentation.

When the decision result is negative in step S4, it is regarded as mere addition of information, and then, processing is terminated (step S9). In addition, when the decision result is negative in step 5 (No in step S5), it is regarded as a request for retrieving object data added with the mark symbol due to mark symbol input (step S6). Then, retrieval of the object data added with the mark symbol is executed, and then, the result is displayed as a list of the resultant candidates, for example (step S7). In this manner, desired data is selected from the list of candidates (step S10), whereby the selected data can be utilized as input data (step S11). In this retrieval operation, for example, after the presentation is terminated, a request for displaying a list of objects and screen shots as data added with a specific symbol, "homework" is issued, for example, and then, the result is listed and displayed at the information display unit 10, thereby making it possible to list portions (objects) added with a plurality of "homework" marks added at the time of presentation. In this manner, the items handled as homework at the time of presentation can be confirmed. In addition, this also applies to the mark "◎". Important items can be confirmed by listing and displaying them while the mark "◎" is used as a retrieval key.

While in the foregoing description, it is assumed that the apparatus has one tablet PC and a projector, the apparatus according to the above embodiment, as shown in FIG. 2, can also be implemented similarly in the case of using an electronic whiteboard displayed while connected to a PC and enabling entry by an electronic pen or using an electronic whiteboard that solely functions like the PC. Further, the present invention is applicable to a case in which an electronic whiteboard terminal or a PC terminal is connected to a server. In this case, a configuration may be provided such that the mark symbol data storage unit 25, the mark symbol accompanying data storage unit 35 or the like exists in a server in accordance with a server client system.

In addition, while the mark symbol data detection unit 30 evaluates identity by comparison of character codes or symbol codes using handwritten character recognition in the embodiment described above, dot matrixes and vector data similar to data to be inputted may be held in the mark symbol data storage unit 25, making it possible to recognize identity by determining similarity of the input data and the stored mark symbol data.

According to the present invention, there can be provided a retrieval apparatus for adding a mark symbol to displayed data, via a pen or a touch panel, thereby retrieving data added with the mark symbol while the mark symbol is used as a retrieval key.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information retrieval apparatus comprising:

a display configured to display document information;

an input unit configured to receive user input to add additional information to the displayed document information at an input location;

a first storage configured to store mark symbol information specifying a particular symbol used for marking;

a detector configured to detect the additional information from the input unit, and to decide whether or not the input additional information is identical to or similar to the mark symbol information stored in the first storage;

a specification unit configured to specify a range of the input location based on a predetermined user selection input received by the input unit;

a second storage configured to store the input additional information which is identical to or similar to the mark symbol information, and to associate the mark symbol information with a portion of the displayed document information within the range; and a retrieval unit configured to retrieve the portion of the displayed document information within the range from the second storage using the mark symbol information as a search key, wherein the retrieved portion of the displayed document information is displayed on the display.

2. The information retrieval apparatus according to claim 1, wherein the input unit includes at least one of a monitor of a tablet PC, which is integrally configured with the display, and an electronic white board.

3. The information retrieval apparatus according to claim 1, wherein the first storage holds the mark symbol information and a symbol code corresponding the mark symbol information by associating them.

4. The information retrieval apparatus according to claim 1, further comprising a second input unit configured to, when a retrieval result of the retrieval unit is displayed on the display, display information associated with the mark symbol information selected from a retrieval result list displayed on the display as input data.

5. The information retrieval apparatus according to claim 1, wherein the predetermined user selection input comprises underlining the portion of displayed document information, and the specification unit specifies the range based on a length of the underlining.

6. The information retrieval apparatus according to claim 1, further comprising a registration unit configured to register at least one of input data input from the input unit and a feature of the input data to the first storage.

7. The information retrieval apparatus according to claim 1, wherein the predetermined user selection input comprises circumscribing the portion of the displayed document information, and the specification unit specifies the range based on the circumscribed information.

* * * * *